US011955757B2

(12) United States Patent
Li et al.

(10) Patent No.: US 11,955,757 B2
(45) Date of Patent: Apr. 9, 2024

(54) FULLY-AUTOMATED TERMINAL CRIMPING DEVICE FOR FACILITATING CABLE POSITIONING

(71) Applicant: STATE GRID ZHEJIANG JIASHAN POWER SUPPLY CO., LTD., Jiaxing (CN)

(72) Inventors: Feiwei Li, Jiaxing (CN); Chongbiao Zhang, Jiaxing (CN); Bo Gao, Jiaxing (CN); Yong He, Jiaxing (CN); Chenwen Qian, Jiaxing (CN); Yanmin Zhao, Jiaxing (CN); Jinwei Chen, Jiaxing (CN)

(73) Assignee: STATE GRID ZHEJIANG JIASHAN POWER SUPPLY CO., LTD., Jiaxing (CN)

( * ) Notice: Subject to any disclaimer, the term of this patent is extended or adjusted under 35 U.S.C. 154(b) by 0 days.

(21) Appl. No.: 18/277,776

(22) PCT Filed: Apr. 2, 2020

(86) PCT No.: PCT/CN2020/082872
§ 371 (c)(1),
(2) Date: Aug. 18, 2023

(87) PCT Pub. No.: WO2021/057008
PCT Pub. Date: Apr. 1, 2021

(65) Prior Publication Data

US 2024/0039225 A1 Feb. 1, 2024

(30) Foreign Application Priority Data

Sep. 25, 2019 (CN) ......................... 201910914081.9

(51) Int. Cl.
*H01R 43/052* (2006.01)

(52) U.S. Cl.
CPC .................................. *H01R 43/052* (2013.01)

(58) Field of Classification Search
CPC ............... H01R 43/0585; Y10S 72/712; Y10T 29/49181; Y10T 29/53235
See application file for complete search history.

(56) References Cited

U.S. PATENT DOCUMENTS

| | | | | |
|---|---|---|---|---|
| 11,652,328 B2 * | 5/2023 | Takeuchi | ............. | H01R 43/055 29/753 |
| 2009/0019912 A1 * | 1/2009 | Yu | ...................... | H01R 43/0585 72/402 |

FOREIGN PATENT DOCUMENTS

| | | |
|---|---|---|
| CN | 203434430 U | 2/2014 |
| CN | 205488953 U | 8/2016 |

(Continued)

*Primary Examiner* — Minh N Trinh
(74) *Attorney, Agent, or Firm* — Bayramoglu Law Offices LLC

(57) ABSTRACT

A fully-automated terminal crimping device for facilitating cable positioning includes an upper pressing die crimping mechanism, cable positioning mechanisms, an ejection mechanism, a terminal pushing slider mechanism, and a terminal clamping mechanism, where the terminal pushing slider mechanism is arranged directly below the upper pressing die crimping mechanism, a lower pressing die base is arranged on the terminal pushing slider mechanism, the terminal clamping mechanism and the ejection mechanism are arranged at the left and right sides of the lower pressing die base respectively, and the two cable positioning mechanisms are arranged at the front and rear ends of the lower pressing die base respectively.

5 Claims, 11 Drawing Sheets

(56) References Cited

FOREIGN PATENT DOCUMENTS

| | | | |
|---|---|---|---|
| CN | 205666421 | U | 10/2016 |
| CN | 205992648 | U | 3/2017 |
| CN | 208093925 | U | 11/2018 |
| CN | 208093927 | U | 11/2018 |
| CN | 209282585 | U | 8/2019 |
| CN | 110829138 | A | 2/2020 |
| JP | 2000123945 | A | 4/2000 |

* cited by examiner

FULLY-AUTOMATED TERMINAL CRIMPING DEVICE FOR FACILITATING CABLE POSITIONING

CROSS REFERENCE TO THE RELATED APPLICATIONS

This application is the national phase entry of International Application No. PCT/CN2020/082872, filed on Apr. 2, 2020, which is based upon and claims priority to Chinese Patent Application No. 201910914081.9, filed on Sep. 25, 2019, the entire contents of which are incorporated herein by reference.

TECHNICAL FIELD

The present invention relates to the field of cable assembly equipment manufacturing, and in particular to a fully-automated terminal crimping device for facilitating cable positioning.

BACKGROUND

Cable terminals are a type of electric wires, power cables and electrical equipment configured to connect power distribution devices in the electrical industry, household appliances and other industries, belonging to a kind of accessory products to realize electrical connection. In the patent of utility model with the authorized announcement number of CN 205488953 U, a cable crimping terminal can only achieve a simple crimping operation, is not provided with a concrete positioning device, and cannot achieve the degree of automation. In the patent utility model with the authorized announcement number of CN 208093925 U, a cable crimping terminal performs positioning at a cable inlet and is not provided with a bidirectional positioning device, and the crimping process is only performed once, so that the crimping quality is not high. In the patent of utility model with the authorized announcement number of CN 203434430 U, there is no terminal clamping mechanism for the crimping process, so that the crimping quality is not high, and the degree of automation is not high. With the increasing degree of industrial automation and the increasingly strict and precise industrial control requirements, attention must be paid to cable terminal crimping quality requirements and precision, and the degree of automation needs to be improved. The cable terminal crimping effect is of a great significance to ensure that the possibility of accidents in power equipment is reduced. At present, the drawbacks of terminal crimping are as follows: all the steps of the crimping method are independent and incoherent, the cable positioning accuracy is poor, the degree of automation is low, the product defect rate is high, the crimping quality and effect are poor, the crimping efficiency is low and the labor cost is high. In order to reduce the shortage of human resources in enterprise crimping processing, improve the efficiency and quality of cable crimping terminals, and reduce enterprise operating costs, a fully-automated terminal crimping device for facilitating cable positioning has been developed. The device orderly achieves the crimping function in a coordinated manner by means of the cooperation of a plurality of mechanisms, thus being accurate in cable positioning, high in degree of automation, good in safety and reliability, simple in structure, convenient to use and install, easy to operate, long in service life, and compact in overall arrangement. The operations of crimping head and end terminals are completed in one process, so that the crimping efficiency is high. The device has a single terminal clamping structure to improve the quality of crimping, thus being suitable for large, small and medium-sized cable production enterprises, and being applied to crimping of various cable product terminals.

SUMMARY

The purpose of the present invention is to provide a fully-automated terminal crimping device for facilitating cable positioning so as to solve the problems that all the steps of the crimping method of a cable crimping device are independent and incoherent, the cable positioning accuracy is poor, the degree of automation is low, the product defect rate is high, the crimping quality and effect are poor, the crimping efficiency is low, and the labor cost is high. The device is simple in structure, convenient to use and install, easy to operate, accurate in cable positioning, high in degree of automation, compact in overall arrangement, and good in crimping efficiency and effect, thus being suitable for large, small and medium-sized cable production enterprises, and being applied to crimping of various cable product terminals; and furthermore, the cable terminal crimping device reduces the operating cost, and is long in service life, safe and good in reliability.

The present invention achieves the above purpose through the following technical solution: a fully-automated terminal crimping device for facilitating cable positioning includes an upper pressing die crimping mechanism, cable positioning mechanisms, an ejection mechanism, a terminal pushing slider mechanism, and a terminal clamping mechanism, where the terminal pushing slider mechanism is arranged directly below the upper pressing die crimping mechanism, a lower pressing die base configured to place a cable terminal to be processed is arranged on the terminal pushing slider mechanism, the terminal clamping mechanism and the ejection mechanism are arranged at the left and right sides of the lower pressing die base respectively, and the two cable positioning mechanisms configured to clamp and position a cable are arranged at the front and rear ends of the lower pressing die base respectively;

- the upper pressing die crimping mechanism includes a first hydraulic cylinder, an upper pressing die, an upper pressing die base, an upper pressing die base plate, a first connecting block, support columns, support pedestals, a support plate, and guide pillars, where the two support pedestals are available, both of which are fixed on a work surface, the bottoms of the support columns are fixed on the support pedestals, and the tops of the support columns are fixed to the bottom of the horizontally arranged support plate by means of bolts; the first hydraulic cylinder is vertically fixed on the support plate, and a central hole through which a hydraulic rod of the first hydraulic cylinder can pass is arranged on the support plate; the hydraulic rod of the first hydraulic cylinder passes through the central hole of the support plate and is connected to the first connecting block, the lower end of the first connecting block is connected to the upper pressing die base plate, the upper pressing die base is installed at the lower end of the upper pressing die base plate, a U-shaped groove for installing the upper pressing die is arranged to the bottom of the upper pressing die base, and the upper pressing die is fixedly installed on the U-shaped groove of the upper pressing die base; two guide holes are further arranged on the support plate, the two vertically arranged guide pillars pass through the two guide holes of the support plate respectively, and both of the lower ends of the two guide pillars are fixed on the upper pressing die base plate; when the first hydraulic cylinder is in motion, the hydraulic rod drives an entire body composed of the first connecting block, the upper pressing die base, the upper pressing die base plate, the upper pressing die, and the two guide pillars to move linearly along the vertical direction;

the terminal pushing slider mechanism includes a terminal pushing hydraulic cylinder, a lower pressing die base plate, a terminal cylinder mounting base plate, a base plate support, a third connecting plate, hydraulic cylinder bases, horizontal flat plates, a second connecting block, the lower pressing die base, a lower pressing die, and side slide rail seats, where the lower pressing die base plate is fixed on the work surface, the third connecting plate is fixedly connected to the lower pressing die base plate, the terminal cylinder mounting base plate is fixedly installed on the third connecting plate, and the terminal cylinder mounting base plate and the upper surface of the lower pressing die base plate are located on the same horizontal plane; the terminal pushing hydraulic cylinder is horizontally fixed on the terminal cylinder mounting base plate by means of the two hydraulic cylinder bases, and the middle of the terminal cylinder mounting base plate is supported on the work surface by means of the base plate support; a hydraulic rod end portion of the terminal pushing hydraulic cylinder is fixedly connected to the lower pressing die base; the two side slide rail seats are arranged on both sides of the lower pressing die base plate respectively, the two side slide rail seats are parallel to each other, and a lower pressing die slide is formed between the two side slide rail seats; the lower pressing die base is arranged inside the lower pressing die slide, and when the terminal pushing hydraulic cylinder moves, the second connecting block drives the lower pressing die base to move linearly in the lower pressing die slide; a groove for installing the lower pressing die is arranged in the lower pressing die base, the lower pressing die is installed in the groove of the lower pressing die base, and the cable terminal to be processed is arranged in the lower pressing die; the second connecting block for connecting the terminal clamping mechanism is fixed to a vertical side face of the lower pressing die base parallel to the side slide rail seats; two vertical guide slots are arranged on the other vertical side face the lower pressing die base parallel to the side slide rail seats; the two horizontal flat plates for connecting the cable positioning mechanisms are fixed to the two vertical side faces of the lower pressing die base perpendicular to the side slide rail seats respectively;

the terminal clamping mechanism includes a terminal clamping cylinder, a terminal clamping connecting rod, a terminal clamping rocker, a terminal clamping connecting plate, a terminal clamping claw, a terminal clamping pin shaft, and a terminal clamping hinge shaft, where the terminal clamping connecting plate is fixedly connected to the second connecting block of the terminal pushing slider mechanism, the terminal clamping cylinder is vertically fixed at one side of the terminal clamping connecting plate away from the terminal pushing slider mechanism, and a hydraulic rod of the terminal clamping cylinder is vertically arranged upwards; the upper end of the hydraulic rod of the terminal clamping cylinder is connected to the lower end of the terminal clamping connecting rod, and the horizontally arranged terminal clamping pin shaft is fixed at the upper end of the terminal clamping connecting rod; the terminal clamping rocker is a V-shaped rocker, and the middle of the terminal clamping rocker is hinged to the upper end of the terminal clamping connecting plate by means of the terminal clamping hinge shaft; a movable groove is arranged at the side edge of the terminal clamping rocker away from the terminal pushing slider mechanism, and the terminal clamping pin shaft is sleeved inside the movable groove of the terminal clamping rocker; the terminal clamping claw is fixedly installed at the lower end of the side edge of the terminal clamping rocker close to the terminal pushing slider mechanism; when the terminal clamping cylinder moves, the hydraulic rod drives the terminal clamping connecting rod to move up and down, which causes the terminal clamping pin shaft positioned at the upper end of the terminal clamping connecting rod to slide in the movable groove of the terminal clamping rocker, and the terminal clamping claw positioned at the other side edge of the terminal clamping connecting rod is further driven to move up and down, thereby achieving the loosing and clamping of the cable terminal located inside the terminal pushing slider mechanism by the terminal clamping claw;

the ejection mechanism includes an ejection cylinder, terminal ejection posts, an ejection connecting plate, an ejection support block, and an ejection fixing plate, where the ejection fixing plate is fixedly installed on the outer side faces with the two vertical guide slots of the vertical side faces of the lower pressing die base of the terminal pushing slider mechanism, the ejection cylinder is vertically installed on the ejection fixing plate, the ejection cylinder is vertically arranged upwards, and the upper end of a piston rod of the ejection cylinder is fixedly connected to the ejection connecting plate; a hold-down groove is arranged to the bottom of the ejection support block, and the ejection connecting plate is fixed in the hold-down groove of the ejection support block; the two terminal ejection posts are horizontally arranged, and one ends of the two terminal ejection posts are fixed on the ejection support block; the two terminal ejection posts pass through the two vertical guide slots formed in the vertical side faces of the lower pressing die base respectively, and both of the two terminal ejection posts are located below the cable terminal to be processed when being at the lowest point; when the ejection cylinder moves, the piston rod drives an entire body composed of the ejection connecting plate, the ejection support block, and the terminal ejection posts to move up and down, thereby realizing that the two terminal ejection posts are allowed to move up and down in the two vertical guide slots, thus ejecting the cable terminal in the lower pressing die base;

each of the cable positioning mechanism includes a cable positioning base, a cable positioning cylinder, cable positioning sliders, a cable positioning slide rail, and two sets of cable clamping blocks, where the cable positioning base is fixedly connected to the corresponding horizontal flat plate of the terminal pushing slider mechanism, and the cable positioning cylinder is fixedly installed on the cable positioning base; the cable positioning slide rail is arranged on the cable positioning base, the two cable positioning sliders are available, one of the cable positioning sliders is fixed at the other end of the cable positioning slide rail, and the other cable positioning slider is sleeved over the cable positioning slide rail and is fixedly connected to a piston rod end portion of the cable positioning cylinder; when the cable positioning cylinder moves, the cable positioning slider connected to the cable positioning cylinder is driven to be close to and away from the other fixed cable positioning slider, and two sets of cable clamping blocks are symmetrically arranged on the two cable positioning sliders; each of the cable clamping blocks includes an L-shaped connecting plate, a roller base, a herringbone connecting block, and rollers, where a bottom plate of the L-shaped connecting plate is fixed on the corresponding cable positioning slider, the herringbone connecting block is fixed on the L-shaped connecting plate, the roller base is fixed on the herringbone connecting block, and the inner side of the roller base is V-shaped; the two sets of rollers are perpendicularly arranged to each other, and are both installed at the inner side of the roller base; and a square cable accommodating cavity for clamping the cable is formed between the rollers of the two cable clamping blocks. The sides of the two sets of rollers in contact with the cable are horizontally V-shaped.

Further, the four support columns and the two support pedestals are available, the two support columns are fixed on each of the support pedestals, studs are arranged at the upper ends of the four support columns, four mounting holes in a square shape are arranged on the support plate, the studs on the four support, columns pass through the four mounting holes of the support plate, and the fixed connection between the support columns and the support plate is realized by screwing nuts on the upper ends of the studs.

Further, each of the guide pillars is composed of a guide sleeve and a guide rod, where the guide sleeve is vertically fixed on the support plate, the guide rod is vertically arranged, the lower end of the guide rod is fixedly connected to the upper pressing die base plate, and the upper end of the guide rod is sheathed in the guide sleeve. When the guide rods move up and down along with the upper pressing die base plate, the upper ends of the guide pillars move up and down within the guide sleeves.

Further, each of the L-shaped connecting plates includes a horizontally arranged horizontal connecting plate and a vertically arranged vertical connecting plate; the bottoms of the horizontal connecting plates of the two L-shaped connecting plates are fixed on the two cable positioning sliders respectively, and the vertical connecting plate of each of the two L-shaped connecting plates is parallel to the other vertical connecting plate and arranged at the side away from the other L-shaped connecting plate. Each of the herringbone connecting blocks includes a vertically arranged base edge and two V-shaped edges arranged at right angles to each other, each of the two V-shaped edges of the herringbone connecting block forms a 45-degree angle with the horizontal plane, the vertical face of the base edge of the herringbone connecting block is fixed at the inner side of the vertical connecting plate of the L-shaped connecting plate, the two V-shaped edges of the herringbone connecting block are connected to another surface at the left of the ground, and the inner side edges of the two V-shaped edges form a horizontally arranged V-shaped connecting block; the roller base includes two roller side edges arranged in a V-shape and two roller flanges protruding from the inner sides of the two roller side edges, and the two roller flanges are parallel to the two corresponding roller side edges respectively; the two ends of one set of rollers are fixed at one of the roller side edges and one of the roller flanges respectively, and the two ends of the other set of rollers are fixed at the other roller side edge and the other roller flange respectively; and the two sets of rollers are perpendicularly arranged to each other.

Further, an angle formed by the two side edges of the terminal clamping rocker is within a range of 120 to 160 degrees, and the length of the side edge of the terminal clamping rocker configured to fix the terminal clamping claw is twice the length of the side edge of the terminal clamping rocker provided with the movable groove.

The present invention has the beneficial effects that the present invention orderly achieves the crimping function in a coordinated manner by means of the cooperation of the plurality of mechanisms, thus improving crimping efficiency and the degree of automation. Clamping jaw assemblies in the cable positioning mechanisms are employed to achieve the effect of accurate cable positioning. The terminal clamping mechanism is configured to improve the terminal crimping quality. The terminal crimping device is simple in structure, convenient to use, long in service life, safe and reliable, is suitable for large, small and medium-sized cable production enterprises, and can be applied to crimping of various cable product terminals.

Figure 1:
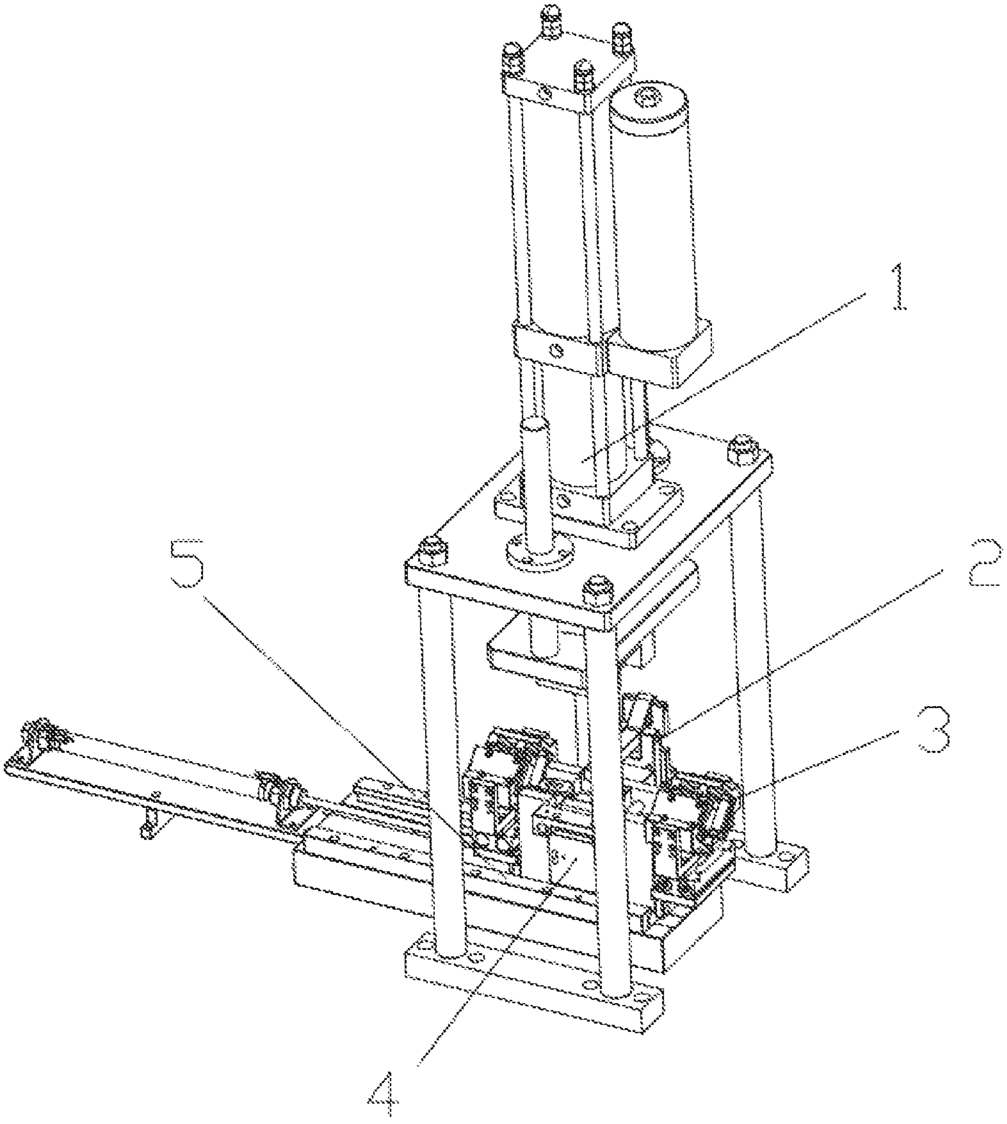
FIG. 1 is a schematic diagram of the overall structure of a fully-automated terminal crimping device for facilitating cable positioning according to the present invention.
Figure 2:
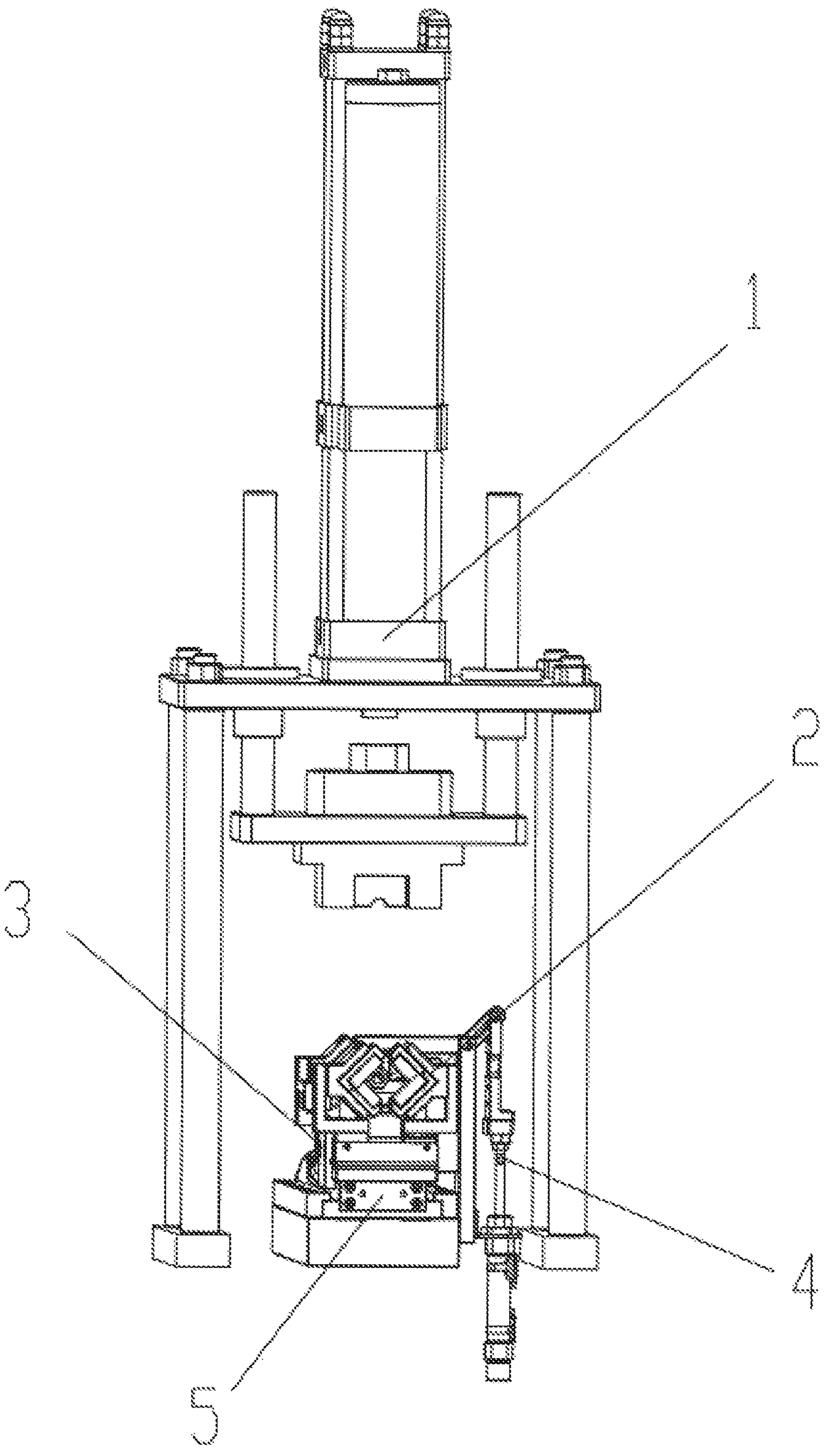
FIG. 2 is a front view of a fully-automated terminal crimping device for facilitating cable positioning according to the present invention.
Figure 3:
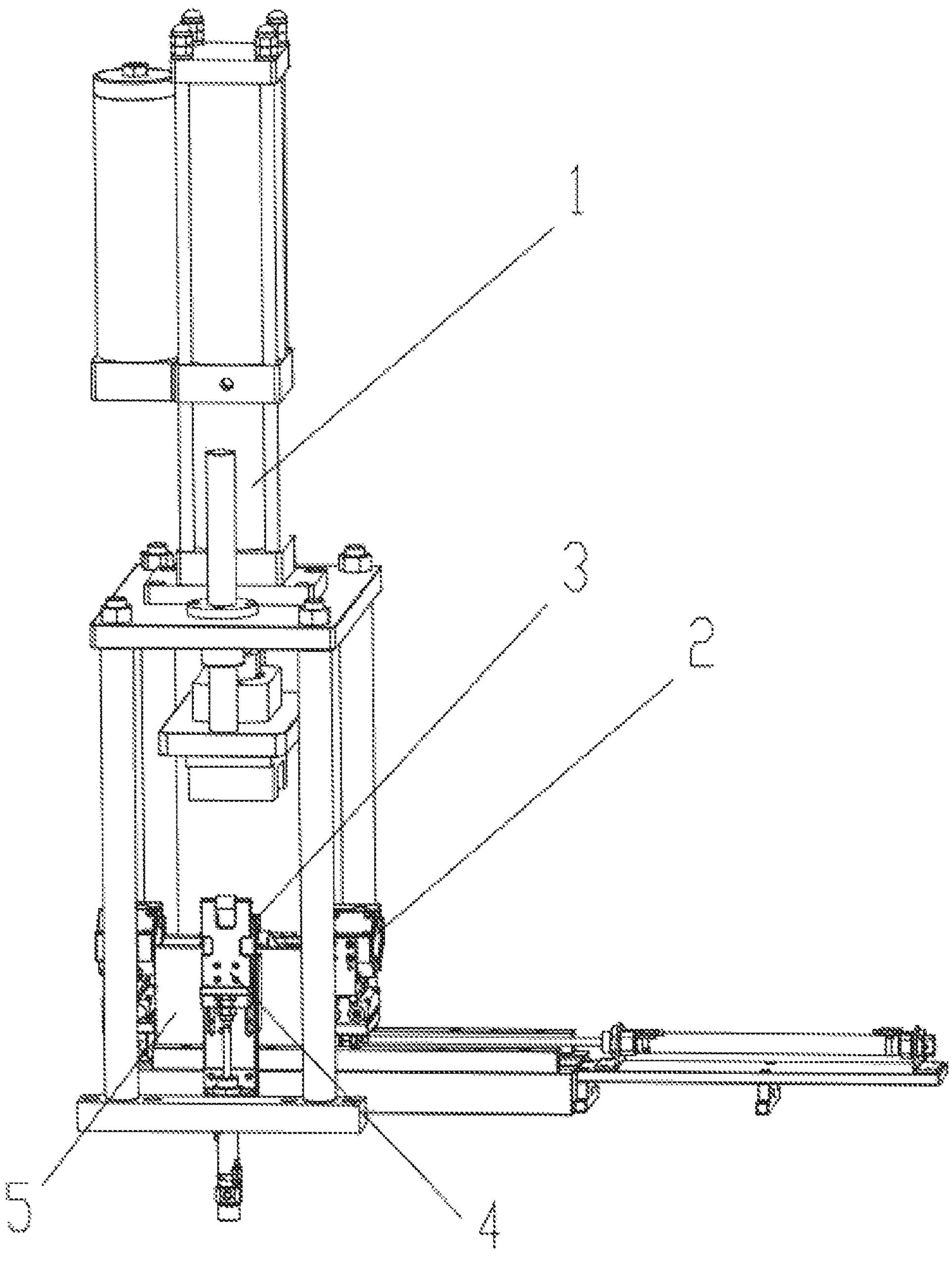
FIG. 3 is a right side view of a fully-automated terminal crimping device for facilitating cable positioning according to the present invention.

In the figures, 1 denotes an upper pressing die crimping mechanism; 2 denotes a terminal clamping mechanism; 3 denotes cable positioning mechanisms; 4 denotes an ejection mechanism; 5 denotes a terminal pushing slider mechanism; 6 denotes a first hydraulic cylinder; 7 denotes an upper pressing die; 8 denotes an upper pressing die base; 9 denotes an upper pressing die base plate; 10 denotes a first connecting block; 11 denotes support columns; 12 denotes support pedestals; 13 denotes a support plate; 14 denotes guide pillars; 15 denotes a cable positioning base; 16 denotes cable positioning sliders; 17 denotes a cable positioning slide rail;

18 denotes L-shaped connecting plates; 19 denotes a roller base; 20 denotes a herringbone connecting block; 21 denotes rollers; 22 denotes an ejection cylinder; 23 denotes terminal ejection posts; 24 denotes an ejection connecting plate; 25 denotes an ejection support block; 26 denotes an ejection fixing plate; 27 denotes a terminal clamping cylinder; 28 denotes a terminal clamping connecting rod; 29 denotes a terminal clamping rocker; 30 denotes a terminal clamping connecting plate; 31 denotes a terminal clamping claw; 32 denotes a terminal clamping pin shaft; 33 denotes a terminal clamping hinge shaft; 34 denotes a movable groove; 35 denotes a terminal pushing hydraulic cylinder; 36 denotes a lower pressing die base plate; 37 denotes a terminal cylinder mounting base plate; 38 denotes a base plate support; 39 denotes side slide rail seats; 40 denotes a third connecting plate; 41 denotes hydraulic cylinder bases; 42 denotes horizontal flat plates; 43 denotes a second connecting block; 44 denotes a lower pressing die base; 45 denotes a cable terminal; and 46 denotes a lower pressing die.

DETAILED DESCRIPTION OF THE EMBODIMENTS

The present invention is further described below in conjunction with the accompanying drawings.

As shown in FIG. 1, FIG. 2, FIG. 3, and FIG. 9, a full-automatic terminal crimping device for facilitating cable positioning includes an upper pressing die crimping mechanism 1, cable positioning mechanisms 3, an ejection mechanism 4, a terminal pushing slider mechanism 5, and a terminal clamping mechanism 2, where the terminal pushing slider mechanism 5 is arranged directly below the upper pressing die crimping mechanism 1, a lower pressing die base 44 configured to place a cable terminal 45 to be processed is arranged on the terminal pushing slider mechanism 5, the terminal clamping mechanism 2 and the ejection mechanism 4 are arranged at the left and right sides of the lower pressing die base 44 respectively, and the two cable positioning mechanisms 3 configured to clamp and position a cable are arranged at the front and rear ends of the lower pressing die base 44 respectively.

Figure 4:
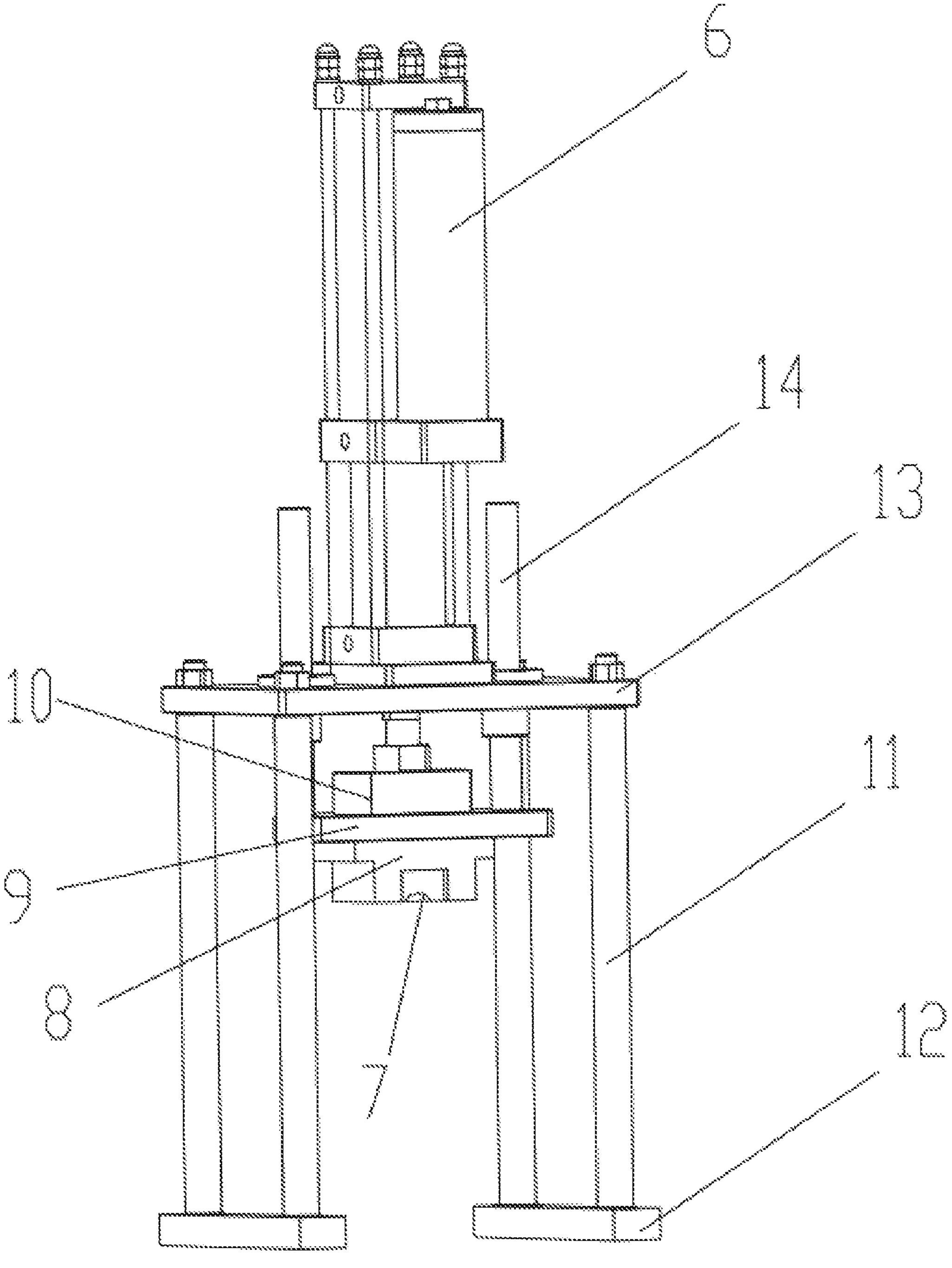
FIG. 4 is a front view of an upper pressing die crimping mechanism according to the present invention.

As shown in FIG. 4, the upper pressing die crimping mechanism 1 includes a first hydraulic cylinder 6, an upper pressing die 7, an upper pressing die base 8, an upper pressing die base plate 9, a first connecting block 10, support columns 11, support pedestals 12, a support plate 13, and guide pillars 14, where the two support pedestals 12 are available, both of which are fixed on a work surface; the bottoms of the support columns 11 are fixed on the support pedestals 12, and the tops of the support columns 11 are fixed to the bottom of the horizontally arranged support plate 13 by means of bolts; the first hydraulic cylinder 6 is vertically fixed on the support plate 13, and a central hole through which a hydraulic rod of the first hydraulic cylinder 6 can pass is arranged on the support plate 13; the hydraulic rod of the first hydraulic cylinder 6 passes through the central hole of the support plate 13 and is connected to the first connecting block 10, the lower end of the first connecting block 10 is connected to the upper pressing die base plate 9, the upper pressing die base 8 is installed at the lower end of the upper pressing die base plate 9, a U-shaped groove for installing the upper pressing die 7 is arranged to the bottom of the upper pressing die base 8, and the upper pressing die 7 is fixedly installed on the U-shaped groove of the upper pressing die base 8; two guide holes are further arranged on the support plate 13, the two vertically arranged guide pillars 14 pass through the two guide holes of the support plate 13 respectively, and both of the lower ends of the two guide pillars 14 are fixed on the upper pressing die base plate 9; and when the first hydraulic cylinder 6 is in motion, the hydraulic rod drives an entire body composed of the first connecting block 10, the upper pressing die base 8, the upper pressing die base plate 9, the upper pressing die 7, and the two guide pillars 14 to move linearly along the vertical direction.

Figure 8:
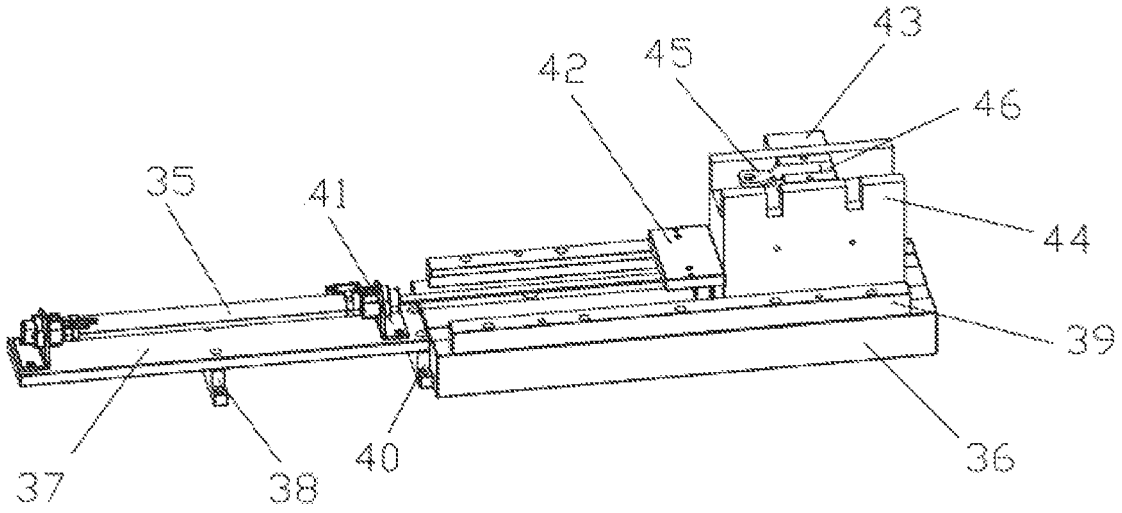
FIG. 8 is a schematic structural diagram of a terminal pushing slider mechanism according to the present invention.
Figure 10:
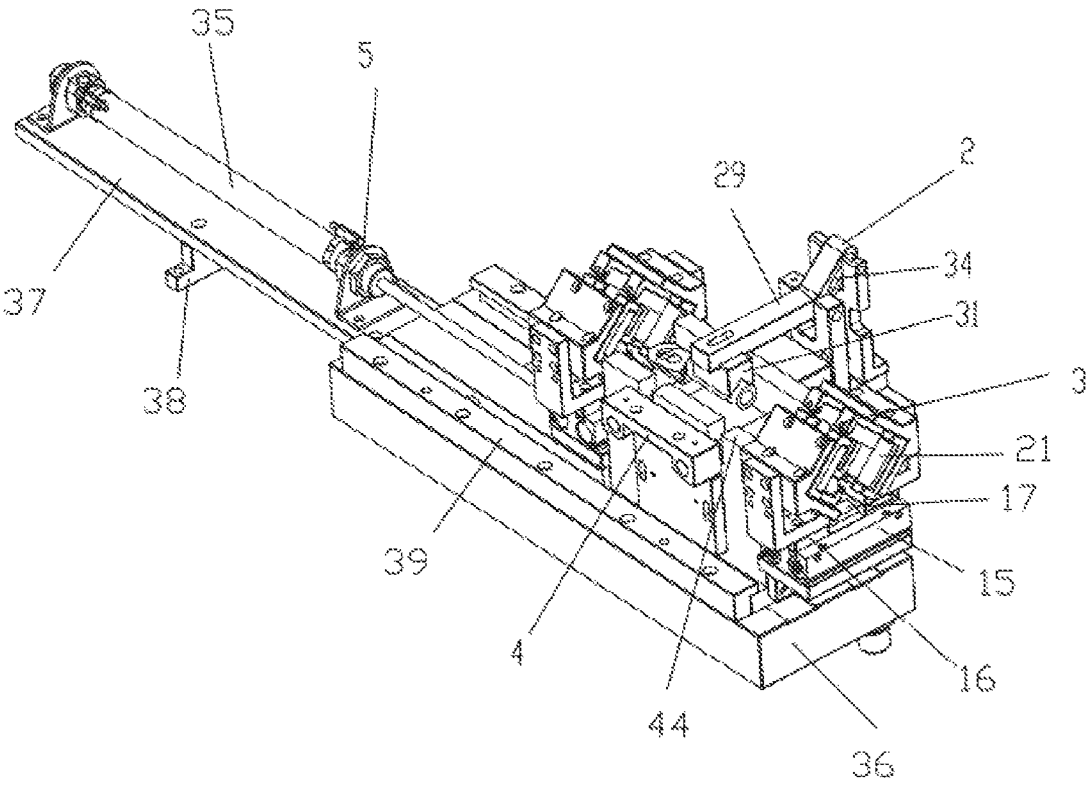
FIG. 10 is a schematic structural diagram of the present invention, in which an upper pressing die crimping mechanism is removed.
Figure 11:
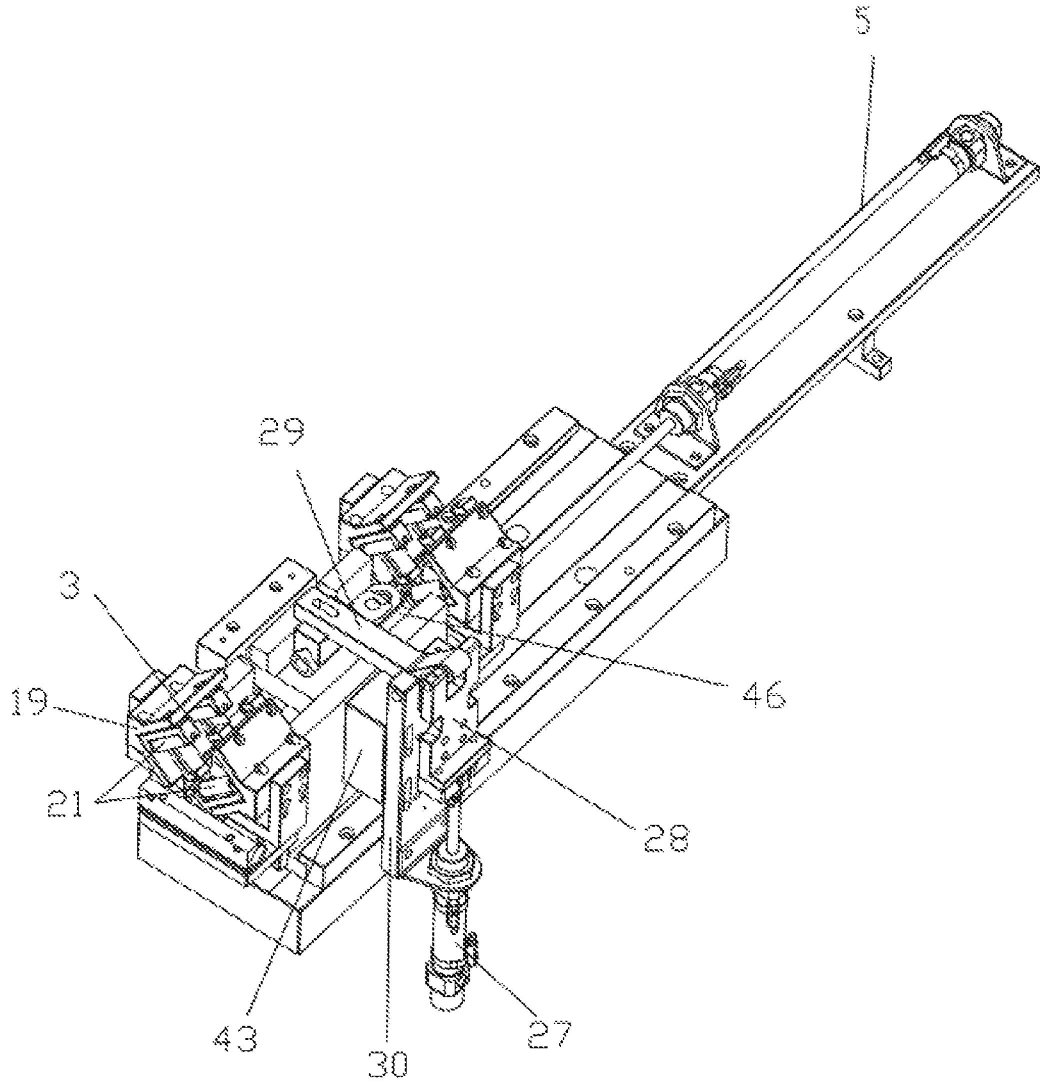
FIG. 11 is a schematic diagram of the structure shown in FIG. 10 from another perspective.

As shown in FIG. 8, FIG. 10 and FIG. 11, the terminal pushing slider mechanism 5 includes a terminal pushing hydraulic cylinder 35, a lower pressing die base plate 36, a terminal cylinder mounting base plate 37, a base plate support 38, a third connecting plate 40, hydraulic cylinder bases 41, horizontal flat plates 42, a second connecting block 43, the lower pressing die base 44, a lower pressing die 46, and side slide rail seats 39, where the lower pressing die base plate 36 is fixed on the work surface, the third connecting plate 40 is fixedly connected to the lower pressing die base plate 36, the terminal cylinder mounting base plate 37 is fixedly installed on the third connecting plate 40, and the terminal cylinder mounting base plate 37 and the upper surface of the lower pressing die base plate 36 are located on the same horizontal plane; the terminal pushing hydraulic cylinder 35 is horizontally fixed on the terminal cylinder mounting base plate 37 by means of the two hydraulic cylinder bases 41, and the middle of the terminal cylinder mounting base plate 37 is supported on the work surface by means of the base plate support 38; a hydraulic rod end portion of the terminal pushing hydraulic cylinder 35 is fixedly connected to the lower pressing die base 44; the two side slide rail seats 39 are arranged on both sides of the lower pressing die base plate 36 respectively, the two side slide rail seats 39 are parallel to each other, and a lower pressing die slide is formed between the two side slide rail seats 39; the lower pressing die base 44 is arranged inside the lower pressing die slide, and when the terminal pushing hydraulic cylinder 35 moves, the second connecting block 43 drives the lower pressing die base 44 to move linearly in the lower pressing die slide; a groove for installing the lower pressing die 46 is arranged in the lower pressing die base 44, the lower pressing die 46 is installed in the groove of the lower pressing die base 44, and the cable terminal 45 to be processed is arranged in the lower pressing die 46; the second connecting block 43 for connecting the terminal clamping mechanism 2 is fixed to a vertical side face of the lower pressing die base 44 parallel to the side slide rail seats 39; two vertical guide slots are arranged on the other vertical side face of the lower pressing die base 44 parallel to the side slide rail seats 39; and the two horizontal flat plates 42 for connecting the cable positioning mechanisms 3 are fixed to the two vertical side faces of the lower pressing die base 44 perpendicular to the side slide rail seats 39 respectively.

Figure 7:
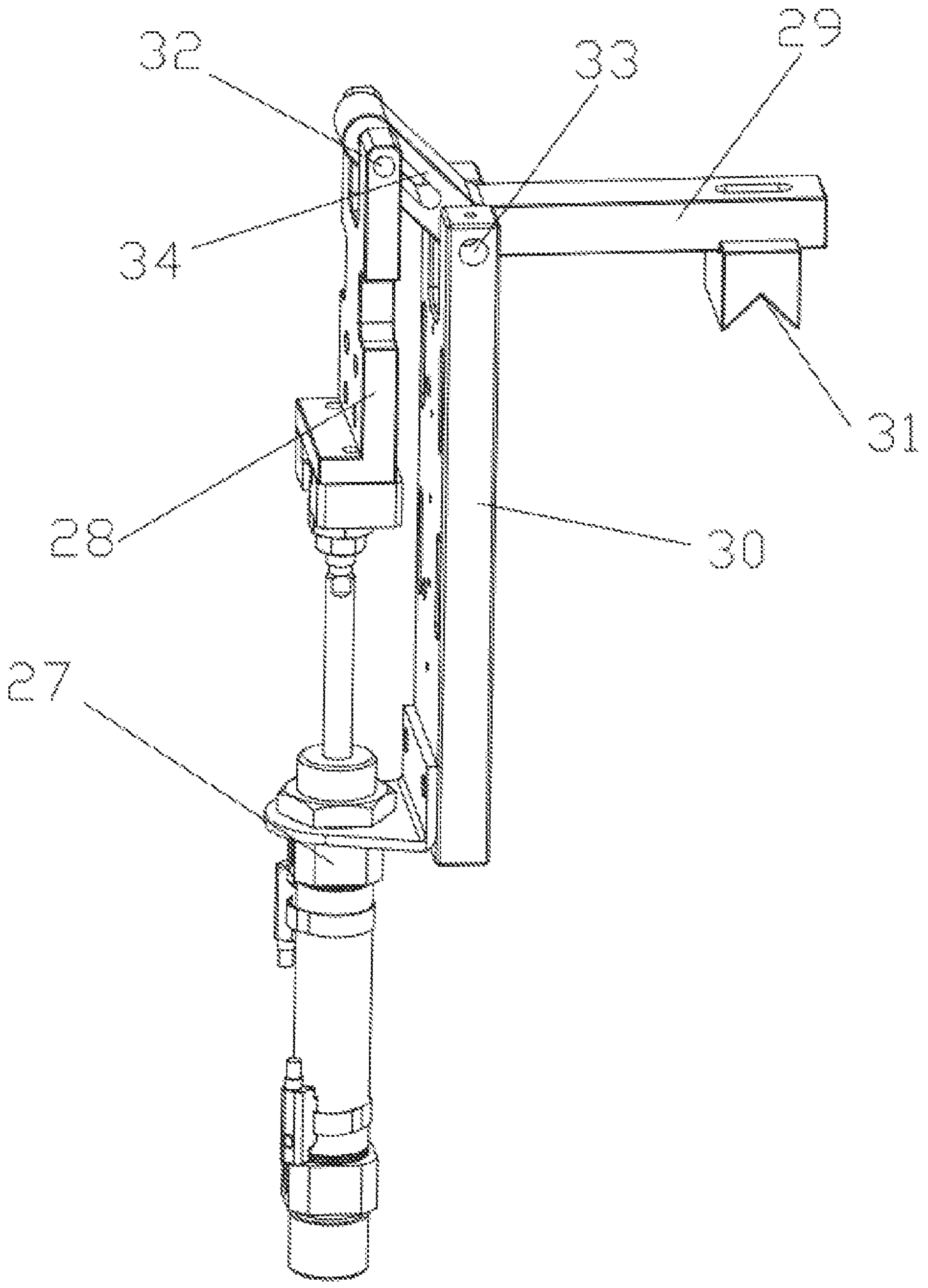
FIG. 7 is a schematic structural diagram of a terminal clamping mechanism according to the present invention.

As shown in FIG. 7 and FIG. 11, the terminal clamping mechanism 2 includes a terminal clamping cylinder 27, a terminal clamping connecting rod 28, a terminal clamping rocker 29, a terminal clamping connecting plate 30, a terminal clamping claw 31, a terminal clamping pin shaft 32, and a terminal clamping hinge shaft 33, where the terminal clamping connecting plate 30 is fixedly connected to the second connecting block 43 of the terminal pushing slider mechanism 5, the terminal clamping cylinder 27 is vertically fixed at one side of the terminal clamping connecting plate 30 away from the terminal pushing slider mechanism 5, and a piston rod of the terminal clamping cylinder 27 is vertically arranged upwards; the upper end of the piston rod of the terminal clamping cylinder 27 is connected to the lower end of the terminal clamping connecting rod 28, and the horizontally arranged terminal clamping pin shaft 32 is fixed at the upper end of the terminal clamping connecting rod 28; the terminal clamping rocker 29 is a V-shaped rocker, and the middle of the terminal clamping rocker 29 is hinged to the upper end of the terminal clamping connecting plate 30 by means of the terminal clamping hinge shaft 33; a movable groove 34 is arranged at the side edge of the terminal clamping rocker away from the terminal pushing slider mechanism 5, and the terminal clamping pin shaft 32 is sleeved inside the movable groove 34 of the terminal clamping rocker; the terminal clamping claw 31 is fixedly installed at the lower end of the side edge of the terminal clamping rocker close to the terminal pushing slider mechanism 5; and when the terminal clamping cylinder 27 moves, the hydraulic rod drives the terminal clamping connecting rod 28 to move up and down, which causes the terminal clamping pin shaft 32 positioned at the upper end of the terminal clamping connecting rod 28 to slide in the movable groove 34 of the terminal clamping rocker, and the terminal clamping claw 31 positioned at the other side edge of the terminal clamping connecting rod 28 is further driven to move up and down, thereby achieving the loosing and clamping of the cable terminal 45 located inside the terminal pushing slider mechanism 5 by the terminal clamping claw 31.

Figure 6:
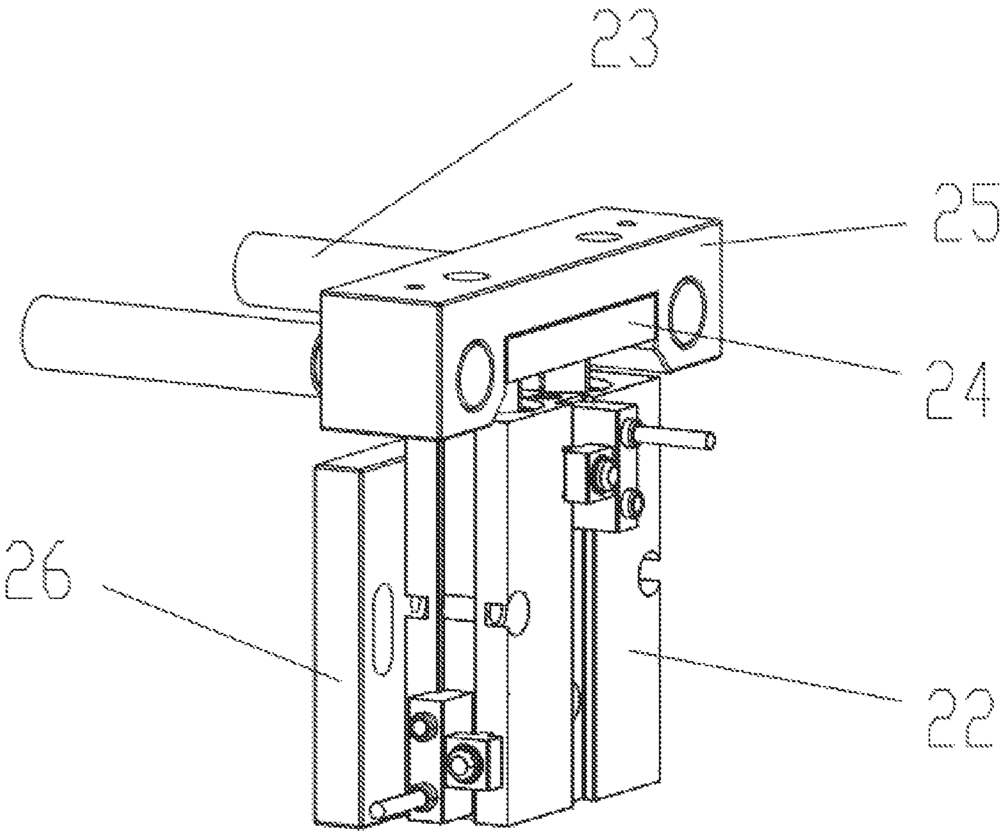
FIG. 6 is a schematic structural diagram of an ejection mechanism according to the present invention.

As shown in FIG. 6, the ejection mechanism 4 includes an ejection cylinder 22, terminal ejection posts 23, an ejection connecting plate 24, an ejection support block 25, and an ejection fixing plate 26, where the ejection fixing plate 26 is fixedly installed on the outer side faces of the vertical side faces with the two vertical guide slots of the lower pressing die base 44 of the terminal pushing slider mechanism 5, the ejection cylinder 22 is vertically installed on the ejection fixing plate 26, the ejection cylinder 22 is vertically arranged upwards, and the upper end of a piston rod of the ejection cylinder 22 is fixedly connected to the ejection connecting plate 24; a hold-down groove is arranged to the bottom of the ejection support block 25, and the ejection connecting plate 24 is fixed in the hold-down groove of the ejection support block 25; the two terminal ejection posts 23 are horizontally arranged, and one ends of the two terminal ejection posts 23 are fixed on the ejection support block 25; the two terminal ejection posts 23 pass through the two vertical guide slots formed in the vertical side faces of the lower pressing die base 44 respectively, and both of the two terminal ejection posts 23 are located below the cable terminal 45 to be processed when being at the lowest point; and when the ejection cylinder 22 moves, the piston rod drives an entire body composed of the ejection connecting plate 24, the ejection support block 25, and the terminal ejection posts 23 to move up and down, thereby realizing that the two terminal ejection posts 23 to move up and down in the two vertical guide slots, thus ejecting the cable terminal 45 in the lower pressing die base 44.

Figure 5:
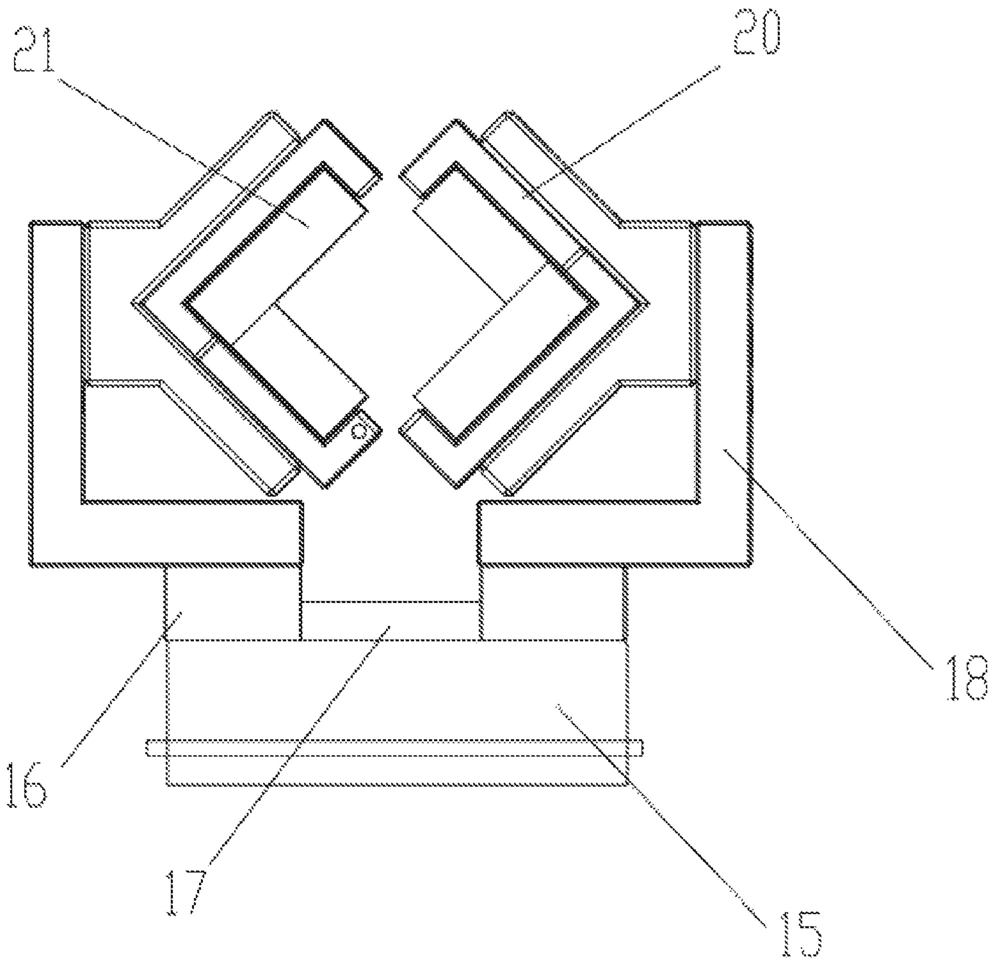
FIG. 5 is a front view of a cable positioning mechanism according to the present invention.

As shown in FIG. 5, FIG. 10 and FIG. 11, each of the cable positioning mechanism 3 includes a cable positioning base 15, a cable positioning cylinder, cable positioning sliders 16, cable positioning slide rail 17, and two sets of cable clamping blocks, where the cable positioning base 15 is fixedly connected to the corresponding horizontal flat plate 42 of the terminal pushing slider mechanism 5, and the cable positioning cylinder is fixedly installed on the cable positioning base 15; the cable positioning slide rail 17 is arranged on the cable positioning base 15, the two cable positioning sliders 16 are available, one of the cable positioning sliders 16 is fixed at the other end of the cable positioning slide rail 17, and the other cable positioning slider 16 is sleeved over the cable positioning slide rail 17 and is fixedly connected to a piston rod end portion of the cable positioning cylinder; when the cable positioning cylinder moves, the cable positioning slider 16 connected to the cable positioning cylinder is driven to be close to and away from the other fixed cable positioning slider 16, and two sets of cable clamping blocks are symmetrically arranged on the two cable positioning sliders 16; each of the cable clamping blocks includes an L-shaped connecting plate 18, a roller base 19, a herringbone connecting block 20, and rollers 21, where a bottom plate of the L-shaped connecting plate 18 is fixed on the corresponding cable positioning slider 16, the herringbone connecting block 20 is fixed on the L-shaped connecting plate 18, the roller base 19 is fixed on the herringbone connecting block 20, and the inner side of the roller base 19 is V-shaped; the two sets of rollers 21 are perpendicularly arranged to each other, and are both installed at the inner side of the roller base 19; and a square cable accommodating cavity for clamping the cable is formed between the rollers 21 of the two cable clamping blocks.

Figure 9:
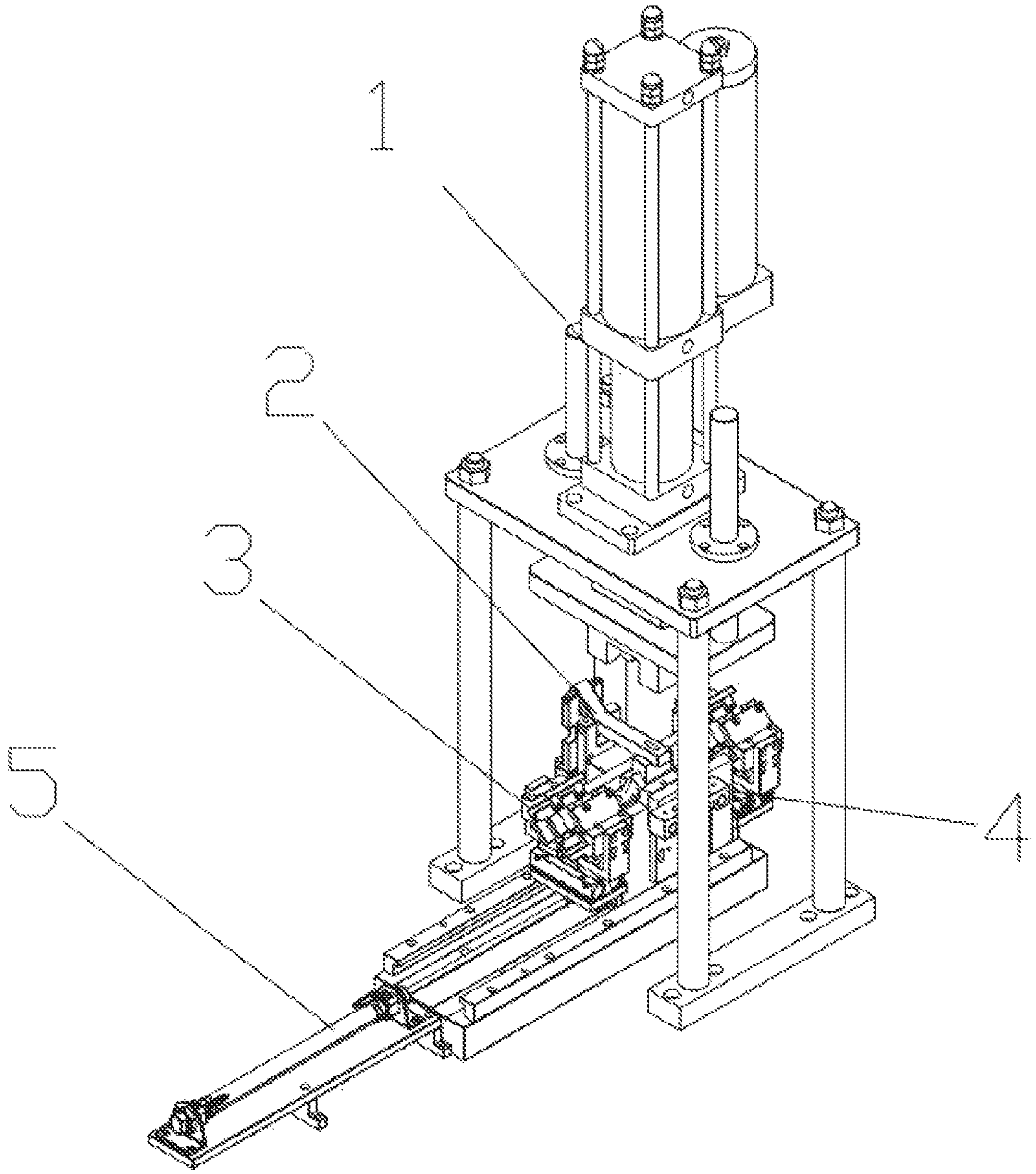
FIG. 9 is a schematic diagram of the overall structure of a fully-automated terminal crimping device for facilitating cable positioning from another perspective according to the present invention.

As shown in FIG. 1 and FIG. 9, the four support columns 11 and the two support pedestals 12 are available, the two support columns 11 are fixed on each of the support pedestals 11 studs are arranged at the upper ends of the four support columns 11, four mounting holes in a square shape are arranged on the support plate 13, studs on the four support columns 11 pass through the four mounting holes of the support plate 13, and the fixed connection between the support columns 11 and the support plate 13 is realized by screwing nuts on the upper ends of the studs.

Each of the guide pillars 14 is composed of a guide sleeve and a guide rod, where the guide sleeve is vertically fixed on the support plate 13, the guide rod is vertically arranged, the lower end of the guide rod is fixedly connected to the upper pressing die base plate 9, and the upper end of the guide rod is sheathed in the guide sleeve.

As shown in FIG. 5, each of the L-shaped connecting plates 18 includes a horizontally arranged horizontal connecting plate and a vertically arranged vertical connecting plate; the bottoms of the horizontal connecting plates of the two L-shaped connecting plates 18 are fixed on the two cable positioning sliders 16 respectively, and the vertical connecting plate of each of the two L-shaped connecting plates 18 is parallel to the other vertical connecting plate and arranged at the side away from the other L-shaped connecting plate 18.

As shown in FIG. 7, FIG. 10 and FIG. 11, an angle formed by the two side edges of the terminal clamping rocker 29 is within a range of 120 to 160 degrees, and the length of the side edge of the terminal clamping rocker 29 configured to fix the terminal clamping claw 31 is twice the length of the side edge of the terminal clamping rocker 29 provided with the movable groove 34.

The present invention is also provided with a control module, which controls hydraulic and pneumatic power assemblies to complete the crimping and resetting actions of the upper pressing die crimping mechanism 1, the push-out action of the ejection mechanism 4, the opening and closing actions of the cable positioning mechanisms 3, the clamping and releasing actions of the terminal clamping mechanism 2, and the forward and backward actions of the terminal pushing slider mechanism 5. Meanwhile, the control module intelligently controls the mutual coordinated actions among the upper pressing die crimping mechanism 1, the cable positioning mechanisms 3, the ejection mechanism 4, the terminal pushing slider mechanism 5, and the terminal clamping mechanism 2, thus ensuring that all the actions are completed orderly and accurately, and achieving complete intelligent control automation.

The specific workflow of the present invention is as follows.

Firstly, the cable passes through the cable positioning mechanisms 3 and is automatically transported to a position where the cable terminal 45 is to be crimped. The cable terminal 45 is placed on the lower pressing die 46 of the terminal pushing slider mechanism 5, and the terminal pushing hydraulic cylinder 35 of the terminal pushing slider mechanism 5 pushes the lower pressing die base plate 36 to move directly below the upper pressing die crimping mechanism 1 along the lower pressing die slide. The terminal clamping cylinder 27 of the terminal clamping mechanism 2 drives the terminal clamping claw 31 to move downwards and clamp the cable terminal 45. The cable positioning cylinders of the cable positioning mechanisms 3 move to make the rollers of the two sets of cable clamping blocks close to each other for clamping the positioning the cable, which allows the cable to accurately extend into the cable terminal 45 after being positioned. At this time, the terminal clamping cylinder 27 of the terminal clamping mechanism 2 moves to make the terminal clamping claw 31 release the cable terminal 45, and the first hydraulic cylinder 6 of the upper pressing die crimping mechanism 1 starts to drive the upper pressing die 7 to move downwards and complete the crimping process together with the lower pressing die 46. After the crimping of both ends of the cable terminal 45 is completed successively, the ejection cylinder 22 of the ejection mechanism 4 drives the terminal ejection posts 23 to move upwards, thus pushing out the cable terminal 45 that has been subjected to crimping. The workflows for crimping head and end terminals of the cable terminal 45 are completely the same.

The foregoing embodiments are only exemplary embodiments of the present invention, and are not intended to limit the technical solution of the present invention. As long as the technical solution can be implemented on the basis of the foregoing embodiments without creative efforts, it shall be deemed to fail within the protection scope of the patent rights of the present invention.

What is claimed is:

1. A fully-automated terminal crimping device for facilitating cable positioning, the device comprising:

an upper pressing die crimping mechanism, cable positioning mechanisms, an ejection mechanism, a terminal pushing slider mechanism, and a terminal clamping mechanism, wherein the terminal pushing slider mechanism is arranged directly below the upper pressing die crimping mechanism, a lower pressing die base configured to place a cable terminal to be processed is arranged on the terminal pushing slider mechanism, the terminal clamping mechanism and the ejection mechanism are arranged at left and right sides of the lower pressing die base respectively, and two of the cable positioning mechanisms are configured to clamp and position a cable, the two of the cable positioning mechanisms are arranged at front and rear ends of the lower pressing die base respectively;

the upper pressing die crimping mechanism comprises a first hydraulic cylinder, an upper pressing die, an upper pressing die base, an upper pressing die base plate, a first connecting block, support columns, support pedestals, a support plate, and guide pillars, wherein two of the support pedestals are fixed on a work surface;

bottoms of the support columns are fixed on the support pedestals, and tops of the support columns are fixed to a bottom of the support plate by means of bolts;

the first hydraulic cylinder is vertically fixed on the support plate, and a central hole of the support plate in which a hydraulic rod of the first hydraulic cylinder can pass on the support plate;

the hydraulic rod of the first hydraulic cylinder passes through the central hole of the support plate and is connected to the first connecting block, a lower end of the first connecting block is connected to the upper pressing die base plate, the upper pressing die base is installed at a lower end of the upper pressing die base plate; a U-shaped groove for installing the upper pressing die is arranged to a bottom of the upper pressing die base, and the upper pressing die is fixedly installed on the U-shaped groove of the upper pressing die base;

two vertically arranged guide pillars pass through two guide holes of the support plate respectively, and both of lower ends of the two guide pillars are fixed on the upper pressing die base plate;

wherein, while the first hydraulic cylinder is in motion, the hydraulic rod drives an entire body composed of the first connecting block, the upper pressing die base, the upper pressing die base plate, the upper pressing die, and the two guide pillars to move linearly along a vertical direction;

the terminal pushing slider mechanism comprises a terminal pushing hydraulic cylinder, a lower pressing die base plate, a terminal cylinder mounting base plate, a base plate support, a third connecting plate, hydraulic cylinder bases, horizontal flat plates, a second connecting block, the lower pressing die base, a lower pressing die, and side slide rail seats, wherein the lower pressing die base plate is fixed on the work surface, the third connecting plate is fixedly connected to the lower pressing die base plate, the terminal cylinder mounting base plate is fixedly installed on the third connecting plate, and the terminal cylinder mounting base plate and an upper surface of the lower pressing die base plate are located on the same horizontal plane;

the terminal pushing hydraulic cylinder is horizontally fixed on the terminal cylinder mounting base plate by means two of the hydraulic cylinder bases, and a middle of the terminal cylinder mounting base plate is supported on the work surface by means of the base plate support;

a hydraulic rod end portion of the terminal pushing hydraulic cylinder is fixedly connected to the lower pressing die base;

two of the side slide rail seats are arranged on both sides of the lower pressing die base plate respectively, the two side slide rail seats are parallel to each other, and a lower pressing die slide is formed between the two side slide rail seats;

the lower pressing die base is arranged inside the lower pressing die slide, and when the terminal pushing hydraulic cylinder moves, the second connecting block drives the lower pressing die base to move linearly in the lower pressing die slide;

a groove of the lower pressing die base configured to install the lower pressing die, the lower pressing die is installed in the groove of the lower pressing die base, and the cable terminal to be processed is arranged in the lower pressing die;

the second connecting block for connecting the terminal clamping mechanism is fixed to a vertical side face of the lower pressing die base parallel to the two side slide rail seats;

two vertical guide slots are arranged on another vertical side face of the lower pressing die base parallel to the two side slide rail seats;

two of the horizontal flat plates for connecting the two cable positioning mechanisms are fixed to the two vertical side faces of the lower pressing die base perpendicular to the two side slide rail seats respectively;

the terminal clamping mechanism comprises a terminal clamping cylinder, a terminal clamping connecting rod, a terminal clamping rocker, a terminal clamping connecting plate, a terminal clamping claw, a terminal clamping pin shaft, and a terminal clamping hinge shaft, wherein the terminal clamping connecting plate is fixedly connected to the second connecting block of the terminal pushing slider mechanism, the terminal clamping cylinder is vertically fixed at one side of the terminal clamping connecting plate away from the terminal pushing slider mechanism, and a hydraulic rod of the terminal clamping cylinder is vertically arranged upwards;

an upper end of the hydraulic rod of the terminal clamping cylinder is connected to a lower end of the terminal clamping connecting rod, and the horizontally arranged terminal clamping pin shaft is fixed at an upper end of the terminal clamping connecting rod;

the terminal clamping rocker is a V-shaped rocker, and a middle of the terminal clamping rocker is hinged to an upper end of the terminal clamping connecting plate by means of the terminal clamping hinge shaft;

a movable groove is arranged at a side edge of the terminal clamping rocker away from the terminal pushing slider mechanism, and the terminal clamping pin shaft is sleeved inside the movable groove of the terminal clamping rocker;

the terminal clamping claw is fixedly installed at a lower end of a side edge of the terminal clamping rocker close to the terminal pushing slider mechanism;

wherein, while the terminal clamping cylinder moves, the hydraulic rod drives the terminal clamping connecting rod to move up and down, which causes the terminal clamping pin shaft positioned at the upper end of the terminal clamping connecting rod to slide in the movable groove of the terminal clamping rocker, and the terminal clamping claw positioned at the other side edge of the terminal clamping connecting rod is further driven to move up and down, thereby achieving loosing and clamping of the cable terminal located inside the terminal pushing slider mechanism by the terminal clamping claw;

the ejection mechanism comprises an ejection cylinder, terminal ejection posts, an ejection connecting plate, an ejection support block, and an ejection fixing plate, wherein the ejection fixing plate is fixedly installed on outer side faces of the vertical side faces with the two vertical guide slots of the lower pressing die base of the terminal pushing slider mechanism, the ejection cylinder is vertically installed on the ejection fixing plate, the ejection cylinder is vertically arranged upwards, and an upper end of a piston rod of the ejection cylinder is fixedly connected to the ejection connecting plate;

a hold-down groove is arranged to a bottom of the ejection support block, and the ejection connecting plate is fixed in the hold-down groove of the ejection support block;

two of the terminal ejection posts are horizontally arranged, and one ends of the two terminal ejection posts are fixed on the ejection support block;

the two terminal ejection posts pass through the two vertical guide slots formed in the vertical side faces of the lower pressing die base respectively, and both of the two terminal ejection posts are located below the cable terminal to be processed when being at a lowest point;

wherein, while the ejection cylinder moves, the piston rod drives an entire body composed of the ejection connecting plate, the ejection support block, and the terminal ejection posts to move up and down, thereby realizing that the two terminal ejection posts are allowed to move up and down in the two vertical guide slots, thus ejecting the cable terminal in the lower pressing die base;

each of the cable positioning mechanisms comprises a cable positioning base, a cable positioning cylinder, cable positioning sliders, a cable positioning slide rail, and two sets of cable clamping blocks, wherein the cable positioning base is fixedly connected to the corresponding horizontal flat plate of the terminal pushing slider mechanism, and the cable positioning cylinder is fixedly, installed on the cable positioning base;

the cable positioning slide rail is arranged on the cable positioning base, the two cable positioning sliders are available, one of the cable positioning sliders is fixed at the other end of the cable positioning slide rail, and the other cable positioning slider is sleeved over the cable positioning slide rail and is fixedly connected to a piston rod end portion of the cable positioning cylinder;

when the cable positioning cylinder moves, the cable positioning slider connected to the cable positioning cylinder is driven to be close to and away from the other fixed cable positioning slider, and the two sets of cable clamping blocks are symmetrically arranged on the two cable positioning sliders;

each of the two sets of the cable clamping blocks comprises an L-shaped connecting plate, a roller base, a herringbone connecting block, and rollers, wherein a bottom plate of the L-shaped connecting plate is fixed on the corresponding cable positioning slider, the herringbone connecting block is fixed on the L-shaped connecting plate, the roller base is fixed on the herringbone connecting block, and an inner side of the roller base is V-shaped;

the two sets of rollers are perpendicularly arranged to each other; and are both installed at the inner side of the roller base; and a square cable accommodating cavity for clamping the cable is formed between the rollers of the two cable clamping blocks.

2. The fully-automated terminal crimping device according to claim 1, wherein the support columns, including four support columns, and the support pedestals including two support pedestals, are available, the two support columns are fixed on each of the support pedestals, studs are arranged at upper ends of the four support columns, four mounting holes in a square shape are arranged on the support plate, the studs on the four support columns pass through the four mounting holes of the support plate, and a fixed connection between the support columns and the support plate is realized by screwing nuts on upper ends of the studs.

3. The fully-automated terminal crimping device according to claim 1, wherein each of the guide pillars comprises of a guide sleeve and a guide rod, wherein the guide sleeve is vertically fixed on the support plate, the guide rod is vertically arranged, a lower end of the guide rod is fixedly connected to the upper pressing die base plate, and an upper end of the guide rod is sheathed in the guide sleeve.

4. The fully-automated terminal crimping device according to claim 1, wherein each of the L-shaped connecting plates comprises a horizontally arranged horizontal connecting plate and a vertically arranged vertical connecting plate;

bottoms of the horizontal connecting plates of the two L-shaped connecting plates are fixed on the two cable positioning sliders respectively; and the vertical connecting plate of each of the two L-shaped connecting plates is parallel to the other vertical connecting plate and arranged at a side away from the other L-shaped connecting plate.

5. The fully-automated terminal crimping device according to claim 1, wherein the two side edges of the terminal clamping rocker form an angle within a range of 120 to 160 degrees, and a length of the side edge of the terminal clamping rocker configured to fix the terminal clamping claw is twice the length of the side edge of the terminal clamping rocker provided with the movable groove.

* * * * *